(No Model.)
C. C. PARKER.
Strainer and Stopper for Wash Basins, &c.
No. 239,667. Patented April 5, 1881.
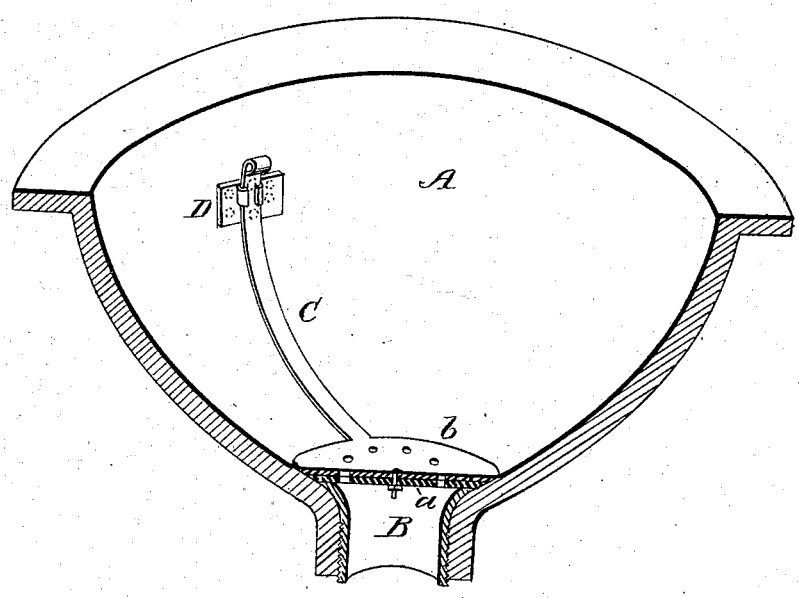
Fig. 1.
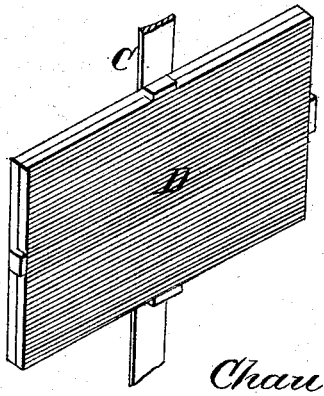
Witnesses:
H. C. McArthur
J. C. Wildman
Inventor
Chauncey C. Parker,
per Chas. H. Fowler,
Attorney.

UNITED STATES PATENT OFFICE.

CHAUNCEY C. PARKER, OF BROOKLYN, NEW YORK.

STRAINER AND STOPPER FOR WASH-BASINS, &c.

SPECIFICATION forming part of Letters Patent No. 239,667, dated April 5, 1881.

Application filed February 24, 1881. (No model.)

*To all whom it may concern:*

Be it known that I, CHAUNCEY C. PARKER, a citizen of the United States, residing at Brooklyn, in the county of Kings and State of New York, have invented certain new and useful Improvements in Strainers and Stoppers for Wash-Basins, &c.; and I do hereby declare that the following is a full, clear, and exact description of the same, reference being had to the annexed drawings, making a part of this specification, and to the letters and figures of reference marked thereon.

Figure 1 of the drawings is a perspective view, in section, of a wash-basin, showing the application of my invention; and Fig. 2 is a detail view, in perspective, of the rubber or elastic faced stopper on an enlarged scale.

The present invention has relation to certain new and useful improvements in that class of strainers or plugs for wash-basins, sinks, bath-tubs, and other like vessels or receptacles consisting of two perforated plates arranged over the discharge-opening, one of said plates being stationary while the other was movable, to bring the openings or holes in said plate to register with those in the stationary plate when desired to drain the vessel or receptacle of its contents. Previous to my invention this movable perforated plate was simply provided with a short knob or handle for turning it in the required direction to open or close the perforations in the lower or stationary plate. There was no material inconvenience in moving or oscillating the plate when the vessel or receptacle was empty; but when filled, especially with dirty or greasy water, in order to turn the plate so as to open the perforations to drain off the contents, it was necessary to plunge the hand down into the water and feel around for the knob or handle to turn the plate, which operation was very unpleasant, owing to the unclean water coming in contact with the hand and wrist.

The object of my invention is to remedy this difficulty by providing the movable plate with an arm extending up along the side of the vessel or receptacle, and above the overflow, whereby the plate can be moved in the required direction to drain off the contents without bringing the hands in contact with the water; also connecting to the upper end of the arm a suitable elastic-faced stopper to close the openings or perforations in the overflow to prevent the escape and exclude noisome smells issuing therefrom.

The above-mentioned objects I attain by the construction shown in the accompanying drawings, and hereinafter described.

In the accompanying drawings, A represents a wash-basin of any of the well-known forms which I have selected to illustrate the application of my invention. Previous to describing my invention, however, I desire to have it understood that my invention is equally applicable to sinks, wash-tubs, or other like receptacles or vessels where a valve-plug for admitting the escape of its contents is required.

The screw-plug B is of metal, and is preferably cast with a perforated plate, *a*, covering the opening in the upper portion thereof. The screw-plug B fits within the discharge-opening of the basin A, and above the plate *a* is located a second perforated plate, *b*, and connected thereto by a screw-nut and bolt, or any other desirable means that will admit of the plate *b* being turned to bring the perforations therein in line with those in the lower plate, *a*, or to close them, as circumstances require. This plate *b* is also composed of metal, and is preferably cast with an arm, C, of sufficient length to extend up along the side of the wash-basin, above the overflow. The arm C has the same curve as the interior sides of the basin A, so that it will lie flat and close against its surface.

To the upper end of the arm C is connected a rubber or other elastic-faced stopper, D, to close the perforations in the overflow and prevent the escape of sewer or other noxious gases. This stopper D is of sufficient width and length to admit of the required side movement of the arm C without uncovering the perforations of the overflow. The stopper D is so connected to the arm C as will render it adjustable thereon to uncover the perforations in the overflow when the contents of the wash-basin is being drawn off, and cover them when the perforations in the plates *a b* are closed, thus forming a perfect seal against the escape of any noisome smells from either the overflow or discharge openings.

When the wash-basin A is full of water the end of the arm C is above the level thereof, and can be manipulated without bringing the hands in contact with the dirty water.

The plates a b are formed with suitable stops, or other equivalent means employed, so that the upper plate, b, is limited in the extent of its motion, whereby it can only turn so as to bring the perforations in line with those in the plate a, or to bring the plate b in position to close them when turned in a reverse direction.

Having now fully described my invention, what I claim as new, and desire to secure by Letters Patent, is—

1. The hollow plug B, having the stationary perforated plate a, in combination with the movable perforated plate b, having arm C, adapted to lie up against the surface of the interior of the vessel or receptacle, and extending on a line with or above the overflow, substantially as and for the purpose set forth.

2. The perforated plate b, having arm C, extending up on line with the overflow of the vessel or receptacle, in combination with the rubber or elastic faced stopper D, connected to the upper end of the arm, and adapted to be adjusted thereon, substantially as and for the purpose specified.

In testimony that I claim the above I have hereunto subscribed my name in the presence of two witnesses.

CHAUNCEY COLTON PARKER.

Witnesses:
RALPH L. COOK,
S. M. GRAHAM.